United States Patent
Kawaguchi et al.

(10) Patent No.: US 8,547,452 B2
(45) Date of Patent: Oct. 1, 2013

(54) IMAGE PROCESSING APPARATUS, IMAGE PROCESSING METHOD, AND IMAGE PROCESSING PROGRAM

(75) Inventors: Takayoshi Kawaguchi, Kanagawa (JP); Takuya Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 13/236,754

(22) Filed: Sep. 20, 2011

(65) Prior Publication Data

US 2012/0075499 A1 Mar. 29, 2012

(30) Foreign Application Priority Data

Sep. 28, 2010 (JP) ................................ P2010-216285

(51) Int. Cl.
*H04N 5/235* (2006.01)
*H04N 5/217* (2011.01)

(52) U.S. Cl.
USPC ........................................ 348/229.1; 348/241

(58) Field of Classification Search
USPC .................................. 348/241, 248, 243, 308
See application file for complete search history.

(56) References Cited

U.S. PATENT DOCUMENTS

| 6,963,370 | B2 * | 11/2005 | DiCarlo et al. | 348/297 |
| 6,977,685 | B1 * | 12/2005 | Acosta-Serafini et al. | 348/308 |
| 7,596,280 | B2 * | 9/2009 | Bilbrey et al. | 382/274 |
| 2008/0219585 | A1 * | 9/2008 | Kasai et al. | 382/274 |
| 2008/0258045 | A1 * | 10/2008 | Oike et al. | 250/208.1 |

FOREIGN PATENT DOCUMENTS

JP 2008-99158 4/2008

* cited by examiner

*Primary Examiner* — Lin Ye
*Assistant Examiner* — Chan Nguyen
(74) *Attorney, Agent, or Firm* — Frommer Lawrence & Haug LLP; William S. Frommer

(57) ABSTRACT

An image processing apparatus including: a pixel array section in which unit pixels, each having a photoelectric conversion element, are two-dimensionally arranged in a matrix; and a signal processing section determining a signal level by any one of a water gate mode determining the signal level in accordance with a first amount of electric charge based on an electric charge accumulated in the unit pixels, the electric charge more than or equal to a prescribed accumulated electric charge, in a first exposure period or a second amount of electric charge based on all the electric charges accumulated in the unit pixels in a second exposure period including the first exposure period and a multiple exposure mode determining the signal level in accordance with a plurality of amounts of electric charge based on all the electric charges accumulated in the unit pixels in a plurality of exposure periods.

4 Claims, 15 Drawing Sheets

IMAGE PROCESSING APPARATUS, IMAGE PROCESSING METHOD, AND IMAGE PROCESSING PROGRAM

BACKGROUND

The present disclosure relates to image processing apparatuses, image processing methods, and image processing programs.

An image pickup device having a CMOS image sensor, such as a video camera or a digital still camera, is used for taking pictures under various environments such as indoors, outdoors, during the day, and during the night. In accordance with changes in the received light, an electronic shutter that controls a charge accumulation period in the CMOS image sensor sets the sensitivity at an optimum value by adjusting the exposure time.

To widen a dynamic range by using the CMOS image sensor, there are a method by which the exposure time is adjusted by releasing the electronic shutter at high speeds, a method by which pictures of a plurality of frames are taken at high speeds and the imaging results are superimposed, and other methods.

In Japanese Unexamined Patent Application Publication No. 2008-99158, a technology that makes it possible to acquire a linear signal with a high signal-to-noise ratio without narrowing the normal saturation level in low illumination and makes it possible to widen a dynamic range while realizing a satisfactory signal-to-noise ratio in a linear region for incident light whose level is higher than or equal to the normal saturation level has been disclosed. In this method, as shown in FIG. 9, for example, the time between $t_4$ and $t_5$ is set at $1/16$ of the exposure time $t_0$ to $t_6$ of one frame. Then, the electric charge more than or equal to the accumulated electric charge $d_M$ is reset at time $t_4$, exposure is performed again between $t_4$ and $t_5$, and the electric charge more than or equal to the accumulated electric charge $d_M$ is reset at time $t_5$. Based on the amount of electric charge $d_3-d_M$ exposed between $t_4$ and $t_5$ and the amount of electric charge $d_4$ exposed in the exposure time ($t_0$ to $t_6$) of one frame, the amount of electric charge which is obtained by exposure in one frame is calculated. Hereinafter, this method is referred to as the water gate method.

SUMMARY

The water gate method described above is a wide dynamic range method by which a signal-to-noise ratio in a dark part is improved because a long exposure time, for example, the exposure time $t_0$ to $t_6$ of FIG. 9 is used in a dark shooting scene. However, with this method it is not possible to change the exposure time unrestrictedly because the original amount of accumulated electric charge of one frame is estimated on the basis of the ratio between the exposure time $t_4$ to $t_5$ and the exposure time $t_0$ to $t_6$ of one frame shown in the example of FIG. 9. As a result, this method deals with a bright shooting scene by narrowing the opening of an iris (a diaphragm) of the image pickup device.

However, exposure control using the iris makes the opening of the iris smaller in the bright shooting scene. As a result, blurring occurs in the entire image due to the diffraction of light (so-called diffraction phenomenon), making it difficult to adjust the focus.

It is desirable to provide a new and improved image processing apparatus, image processing method, and image processing program that can realize a wide dynamic range with an improved signal-to-noise ratio in a dark shooting scene without performing exposure control using an iris in a bright shooting scene.

According to an embodiment of the present disclosure, there is provided an image processing apparatus including: a pixel array section in which unit pixels, each having a photoelectric conversion element converting light into an electric charge, are two-dimensionally arranged in a matrix; and a signal processing section that determines a signal level by using any one of a water gate mode and a multiple exposure mode, the water gate mode being a mode in which the signal level is determined in accordance with a first amount of electric charge based on an electric charge accumulated in the unit pixels, the electric charge being more than or equal to a prescribed accumulated electric charge, in a first exposure period or a second amount of electric charge based on all the electric charges accumulated in the unit pixels in a second exposure period including the first exposure period, the multiple exposure mode being a mode in which the signal level is determined in accordance with a plurality of amounts of electric charge based on all the electric charges accumulated in the unit pixels in a plurality of exposure periods.

The signal processing section may determine gain adjusting the signal level in accordance with a detection value based on the electric charge, and switch a mode to any one of the water gate mode and the multiple exposure mode based on the gain.

When the mode is the water gate mode, the signal processing section may switch the mode to the multiple exposure mode when the gain becomes 0. Moreover, when the mode is the multiple exposure mode, the signal processing section may switch the mode to the water gate mode when the gain becomes more than or equal to a previously set hysteresis.

Moreover, according to another embodiment of the present disclosure, there is provided a method for processing an image, including: converting light into an electric charge by using a pixel array section in which unit pixels, each having a photoelectric conversion element, are two-dimensionally arranged in a matrix; and determining a signal level by a signal processing section by using any one of a water gate mode and a multiple exposure mode, the water gate mode being a mode in which the signal level is determined in accordance with a first amount of electric charge based on an electric charge accumulated in the unit pixels, the electric charge being more than or equal to a prescribed accumulated electric charge, in a first exposure period or a second amount of electric charge based on all the electric charges accumulated in the unit pixels in a second exposure period including the first exposure period, the multiple exposure mode being a mode in which the signal level is determined in accordance with a plurality of amounts of electric charge based on all the electric charges accumulated in the unit pixels in a plurality of exposure periods.

Furthermore, according to still another embodiment of the present disclosure, there is provided a program making a computer convert light into an electric charge by using a pixel array section in which unit pixels, each having a photoelectric conversion element, are two-dimensionally arranged in a matrix; and determine a signal level by a signal processing section by using any one of a water gate mode and a multiple exposure mode, the water gate mode being a mode in which the signal level is determined in accordance with a first amount of electric charge based on an electric charge accumulated in the unit pixels, the electric charge being more than or equal to a prescribed accumulated electric charge, in a first exposure period or a second amount of electric charge based on all the electric charges accumulated in the unit pixels in a second exposure period including the first exposure period, the multiple exposure mode being a mode in which the signal level is determined in accordance with a plurality of amounts of electric charge based on all the electric charges accumulated in the unit pixels in a plurality of exposure periods.

As described above, according to an embodiment of the present disclosure, it is possible to realize a wide dynamic range with an improved signal-to-noise ratio in a dark shooting scene without performing exposure control using an iris in a bright shooting scene.

DETAILED DESCRIPTION OF EMBODIMENTS

Figure 1:
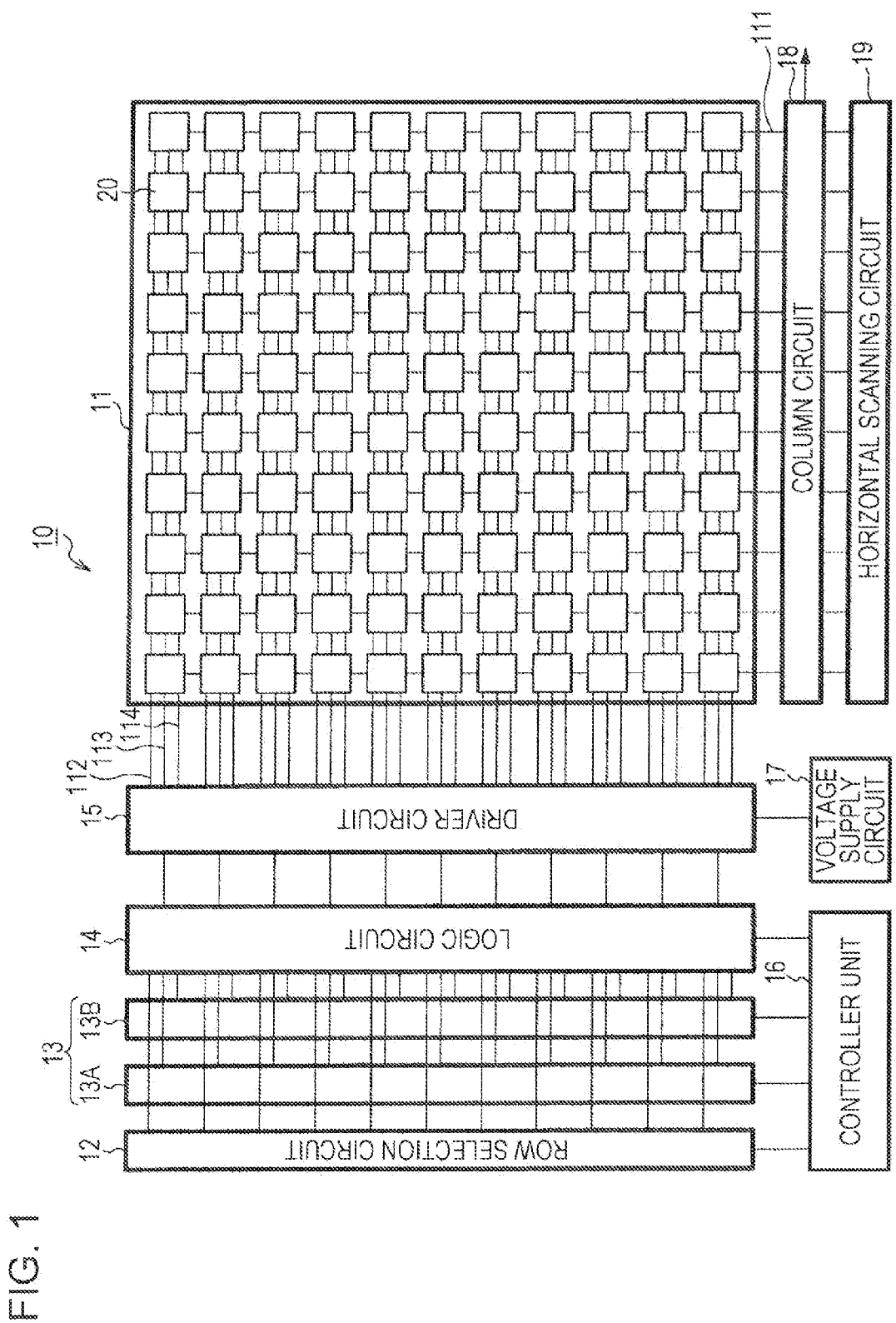
FIG. 1 is a system configuration diagram showing a configuration example, of a CMOS image sensor according to an embodiment of the present disclosure.

Hereinafter, a preferred embodiment of the present disclosure will be described in detail with reference to the accompanying drawings. It is to be noted that, in this specification and the drawings, virtually identical functional components are identified with the same reference characters, and overlapping explanations will be omitted.

Incidentally, a description will be given in the following order:
1. Configuration of an Embodiment
2. Operation of the Embodiment

1. Configuration of an Embodiment

FIG. 1 is a system configuration diagram showing a configuration example of a solid state image pickup device, such as a CMOS image sensor, according to an embodiment of the present disclosure.

As shown in FIG. 1, a CMOS image sensor 10 according to this embodiment includes a pixel array section 11 in which unit pixels (hereinafter also referred to simply as pixels) 20, each including a photoelectric conversion element, are two-dimensionally arranged in a matrix, and includes, as peripheral circuits of the pixel array section 11, a row selection circuit 12, an advance selection circuit 13, a logic circuit 14, a driver circuit 15, a controller unit 16, a voltage supply circuit 17, a column circuit 18, and a horizontal scanning circuit 19.

In the pixel array section 11, for the matrix arrangement of the unit pixels 20, a vertical signal line 111 is laid for each column, and drive control lines, for example, a transfer control line 112, a reset control line 113, and a selection control line 114 are laid for each row.

Pixel Circuit

Figure 2:
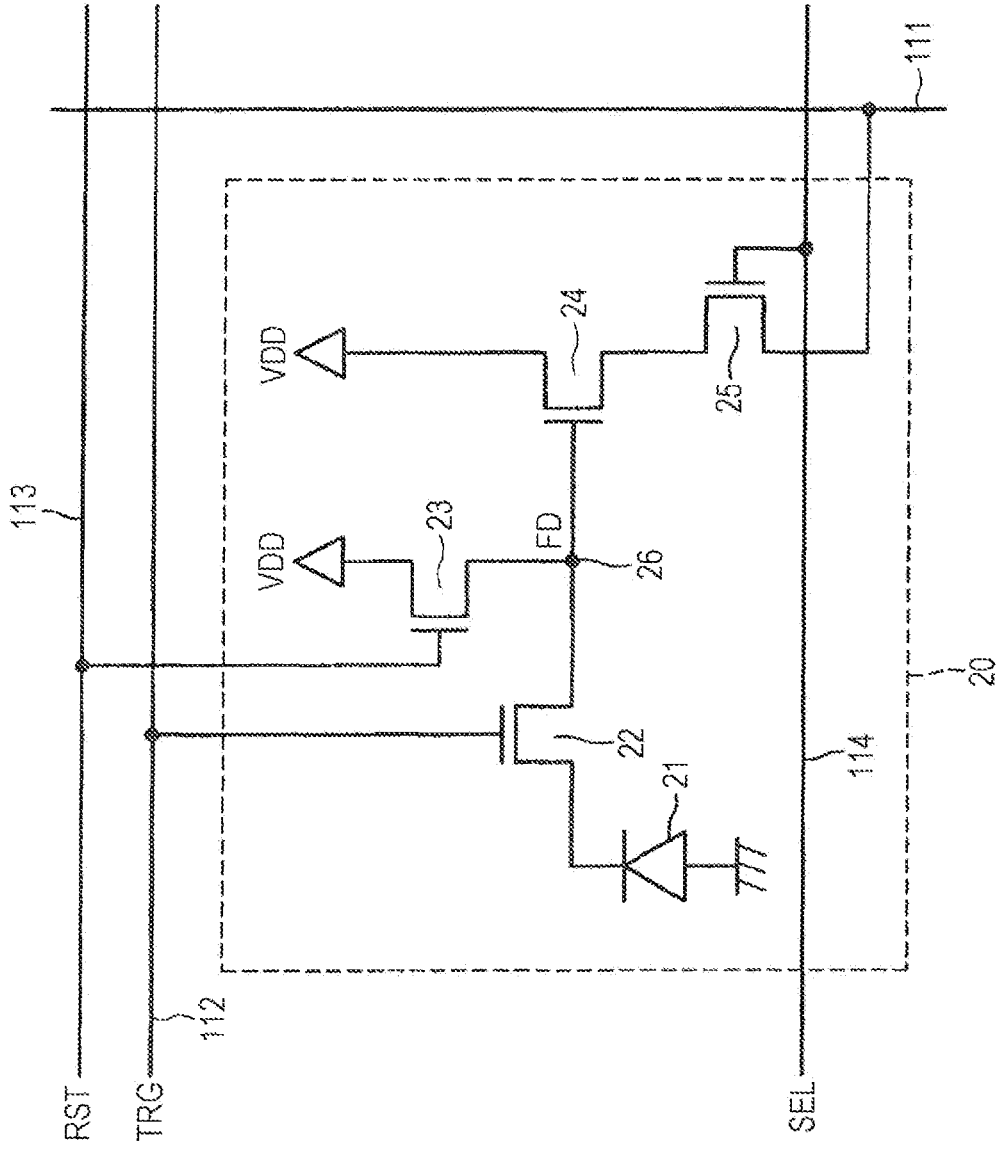
FIG. 2 is a circuit diagram showing an example of the configuration of a unit pixel.

In FIG. 2, an example of the configuration of the unit pixel 20 is shown. The unit pixel 20 according to this circuit example has a pixel configuration including, in addition to the photoelectric conversion element, for example, a photodiode 21, four transistors: a transfer transistor 22, a reset transistor 23, an amplification transistor 24, and a selection transistor 25, for example, that is, a destructive readout pixel configuration having the transfer transistor 22 corresponding to a transfer gate according to an embodiment of the present disclosure. Here, as the transistors 22 to 25, NMOS transistors, for example, are used.

The transfer transistor 22 is connected between a cathode electrode of the photodiode 21 and an FD (floating diffusion) section 26 which is a charge voltage converting section, and transfers signal charges (here, electrons) which have been photoelectrically converted by the photodiode 21 and accumulated therein to the FD section 26 as a result of a transfer pulse TRG being provided to a gate electrode (a control electrode).

A drain electrode of the reset transistor 23 is connected to a pixel power supply VDD, and a source electrode of the reset transistor 23 is connected to the FD section 26. The reset transistor 23 resets the electric potential of the FD section 26 to a predetermined electric potential as a result of a reset pulse RST being provided to a gate electrode prior to transfer of the signal charges from the photodiode 21 to the FD section 26.

A gate electrode of the amplification transistor 24 is connected to the FD section 26, and a drain electrode of the amplification transistor 24 is connected to the pixel power supply VDD. The amplification transistor 24 outputs the electric potential of the FD section 26, namely, the electric potential obtained after resetting has been performed by the reset transistor 23, as a reset level, and outputs the electric potential of the FD section 26, namely, the electric potential obtained after transferring of the signal charges has been performed by the transfer transistor 22, as a signal level.

For example, a drain electrode of the selection transistor 25 is connected to a source electrode of the amplification transistor 24, and a source electrode of the selection transistor 25 is connected to the vertical signal line 111. The selection transistor 25 is brought into an ON state as a result of a selection pulse SEL being provided to a gate electrode, changes the state of the pixel 20 to a selection state, and outputs a signal output from the amplification transistor 24 to the vertical signal line 111.

Incidentally, a configuration in which the selection transistor 25 is connected between the pixel power supply VDD and the drain electrode of the amplification transistor 24 can also be adopted. Moreover, the configuration of the pixel circuit is not limited to the above-described four-transistor configuration. The pixel circuit may adopt a three-transistor configuration in which the selection transistor 25 is omitted and the amplification transistor 24 is used also as the selection transistor 25 or a configuration in which the amplification transistor 24 is shared among a plurality of unit pixels.

Row Selection Circuit

The row selection circuit 12 corresponds to a first drive unit according to an embodiment of the present disclosure, and is formed of a shift register or an address decoder, etc. Under control of the controller unit 16, the row selection circuit 12 makes a selection while scanning, in a perpendicular direction (a vertical direction) on a row-by-row basis, the pixels 20 of the pixel array section 11 for each electronic shutter row and each readout row by appropriately generating the pixel drive pulses such as the transfer pulse TRG, the reset pulse RST, and the selection pulse SEL, performs, on the electronic shutter row, an electronic shutter operation for sweeping signals of the pixels 20 in that row, and performs, for the readout row, a readout operation for reading out signals of the pixels 20 in that row.

Although not shown in the drawing, the row selection circuit 12 has a readout scanning system for performing a readout operation that reads out a signal of each pixel 20 of the readout row while performing selective scanning on the pixels 20 one after another on a row-by-row basis and an electronic shutter scanning system for performing an electronic shutter operation on the same row (electronic shutter row), the duration of time corresponding to the shutter speed ahead of the readout scanning which is performed by the readout scanning system.

A period from the time at which unnecessary electric charge of the photodiode 21 is reset by the electronic shutter operation performed by the electronic shutter scanning system to the time at which a signal of the pixel 20 is read out by the readout operation performed by the readout scanning system is a signal charge accumulation period (a first exposure time) in the pixel 20. That is, the electronic shutter operation is the operation that performs resetting (sweep) of the signal charges accumulated in the photodiode 21 and newly starts accumulation of signal charges after the resetting.

Advance Selection Circuit

The advance selection circuit 13 corresponds to a second drive unit according to an embodiment of the present disclosure. The advance selection circuit 13 is formed of a plurality of row selection circuits, for example, two row selection circuits 13A and 13B, and performs selective scanning on a plurality of rows (in this example, two rows) at regular intervals before a readout row on which selective scanning is performed by the row selection circuit 12.

The row selection circuits 13A and 13B are each formed of a shift register or an address decoder, etc. Under control of the controller unit 16, the row selection circuits 13A and 13B perform selective scanning on two rows at regular intervals by appropriately generating the transfer pulse TRG in synchronization with the selective scanning performed by the row selection circuit 12 before a readout row on which selective scanning is performed by the row selection circuit 12. In the selective scanning, an operation in which the signal charges accumulated in the photodiode 21 are transferred to the FD section 26 based on the transfer pulse TRG is performed. The details of this operation will be described later.

Logic Circuit

Under control of the controller unit 16, the logic circuit 14 supplies the transfer pulse TRG, the reset pulse RST, and the selection pulse SEL which are output from the row selection circuit 12 and the two row selection circuits 13A and 13B of the advance selection circuit 13 for row selection to the transfer control line 112, the reset control line 113, and the selection control line 114 of the pixel array section 11 via the driver circuit 15, and, as will be described later, provides a signal for selecting a voltage value of the transfer pulse TRG to the driver circuit 15.

Driver Circuit

The driver circuit 15 supplies to the pixel 20 the transfer pulse TRG, the reset pulse RST, and the selection pulse SEL at a voltage for turning ON/OFF the transistors 22, 23, and 25 of the pixel 20 in synchronization with the selective scanning performed by the row selection circuit 12, and supplies the transfer pulse TRG at an intermediate voltage of the voltage for turning ON/OFF the transistors 22, 23, and 25 of the pixel 20 (hereinafter referred to as an intermediate voltage) to the pixel 20 in synchronization with the selective scanning performed by the row selection circuits 13A and 13B. That is, the driver circuit 15 functions as first to third supply voltage control units according to an embodiment of the present disclosure.

Figure 3:
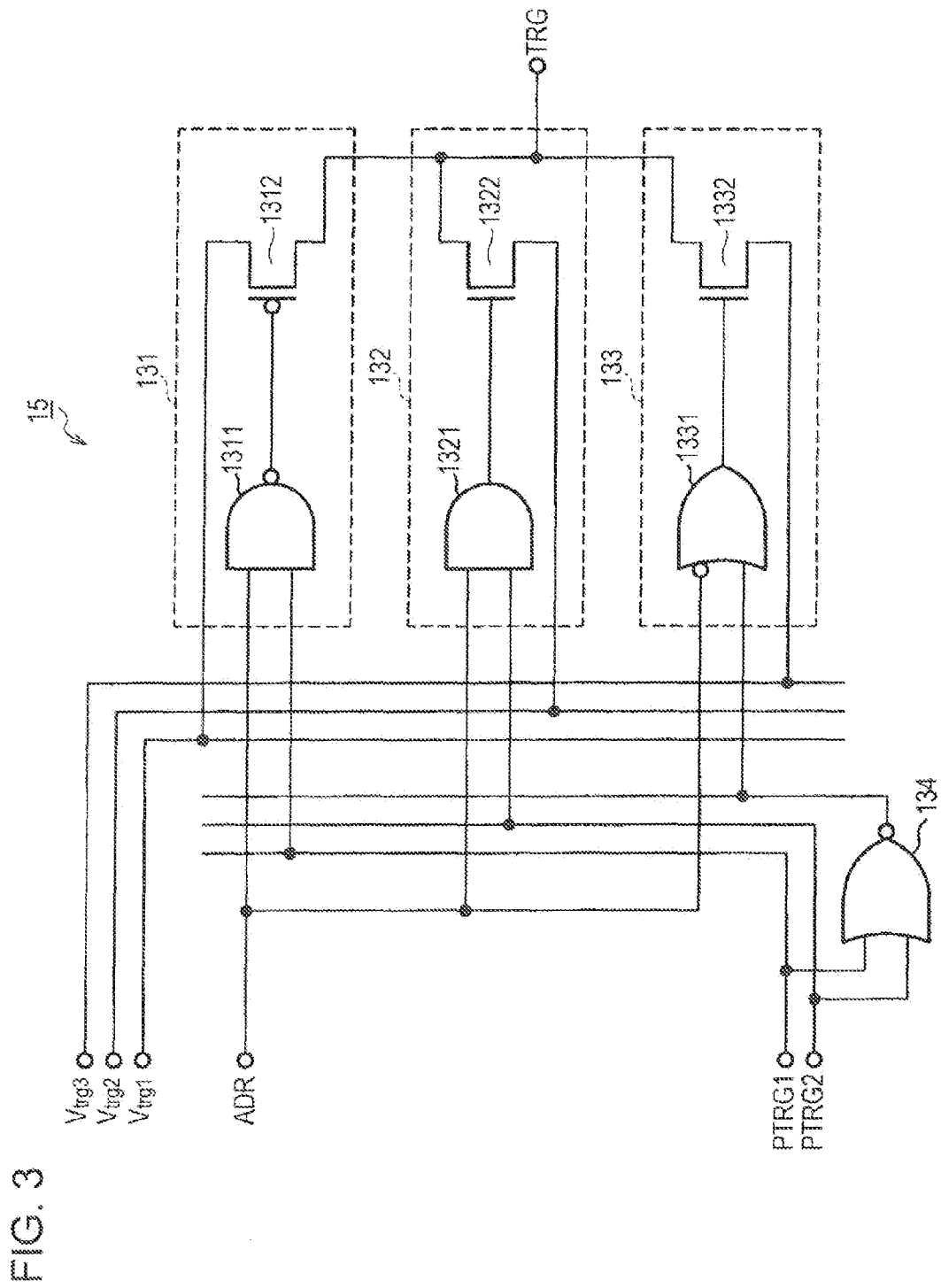
FIG. 3 is a circuit diagram showing an example of the configuration of a driver circuit.

FIG. 3 is a circuit diagram showing an example of the configuration of the driver circuit 15. Here, the configuration of a unit circuit for the transfer pulse TRG of the driver circuit 15 corresponding to a certain row is shown. The driver circuit 15 is formed by arranging as many unit circuits for the transfer pulse TRG as the number of rows of the pixel array section 11 in conjunction with the unit circuits for the reset pulse RST and the selection pulse SEL.

As shown in FIG. 3, the driver circuit (the unit circuit) 15 according to this example has a circuit configuration including three circuit blocks 131 to 133 corresponding to three voltages $V_{trg1}$, $V_{trg2}$, and $V_{trg3}$, for example, which are supplied from the voltage supply circuit 17 and a two-input NOR circuit 134.

Of the three voltages $V_{trg1}$, $V_{trg2}$, and $V_{trg3}$, the voltages $V_{trg1}$ and $V_{trg3}$ serve as a voltage for turning ON/OFF the transistors 22, 23, and 25 of the pixel 20, and the voltage $V_{trg2}$ serves as the intermediate voltage described above.

The driver circuit 15 is provided with an address signal ADR from the row selection circuit 12 and the row selection circuits 13A and 13B. In addition, under control of the controller unit 16, a timing signal PTRG1 is provided to the driver circuit 15 from the logic circuit 14 at the time at which row selection is performed, and a timing signal PTRG2 is provided to the driver circuit 15 at the time at which the intermediate voltage is applied.

The circuit block 131 is formed of a NAND circuit 1311 using the address signal ADR and the timing signal PTRG1 as two inputs and a P-channel drive transistor 1312. The circuit block 131 selects the voltage $V_{trg1}$ and supplies the voltage $V_{trg1}$ to the gate electrode of the transfer transistor 22.

The circuit block 132 is formed of an AND circuit 1321 using the address signal ADR and the timing signal PTRG2 as two inputs and an N-channel drive transistor 1322. The circuit block 132 selects the voltage $V_{trg2}$ which is the intermediate voltage and supplies the voltage $V_{trg2}$ to the gate electrode of the transfer transistor 22.

The circuit block 133 is formed of an OR circuit 1331 using the address signal ADR as one (negative) input and an output signal of the NOR circuit 134 as the other input and an N-channel drive transistor 1332. The circuit block 133 selects the voltage $V_{trg3}$ and supplies the voltage $V_{trg3}$ to the gate electrode of the transfer transistor 22.

That is, the circuit block 133 has a circuit configuration in which the circuit block 133 operates exclusively for the other circuit blocks 131 and 132 by the action of the NOR circuit 134 to supply, for example, a ground voltage or a voltage (for example, −1.0 V) which is lower than the ground voltage as a voltage for turning OFF the transfer transistor 22.

Column Circuit

The column circuit 18 is formed of a group of unit circuits arranged for each pixel column, for example, of the pixel array section 11, that is, the unit circuits and pixel columns are arranged so as to have a one-to-one relationship. The column circuit 18 performs predetermined signal processing on the signals output from the pixels 20 via the vertical signal line 111, the pixels 20 of the readout row selected by the row selection circuit 12 and the row selection circuits 13A and 13B, and temporarily holds the pixel signals subjected to signal processing.

As the column circuit 18, a column circuit having a circuit configuration formed of a sample-and-hold circuit that samples and holds the signals output via the vertical signal line 111 or a column circuit having a circuit configuration formed of a noise removal circuit that includes a sample-and-hold circuit and that removes fixed pattern noise specific to the pixel, such as reset noise or variations in a threshold of the amplification transistor 24, by correlated double sampling (CDS) processing, is used.

However, the above-described configuration of the column circuit 18 is merely an example, and the present disclosure is not limited thereto. For example, a configuration in which the column circuit 18 has an analog/digital (A/D) conversion function and outputs a signal level as a digital signal can also be adopted.

Horizontal Scanning Circuit

The horizontal scanning circuit 19 is formed of a shift register or an address decoder, etc. The horizontal scanning circuit 19 sequentially outputs the signals of the pixels, the signals temporarily held in the unit circuits of the column circuit 18, while sequentially performing horizontal scanning on the unit circuits of the column circuit 18 for each pixel column of the pixel array section 11.

Next, the operation of the CMOS image sensor 10 according to this embodiment configured as described above will be described by using a timing diagram illustrated in FIG. 4.

Figure 4:
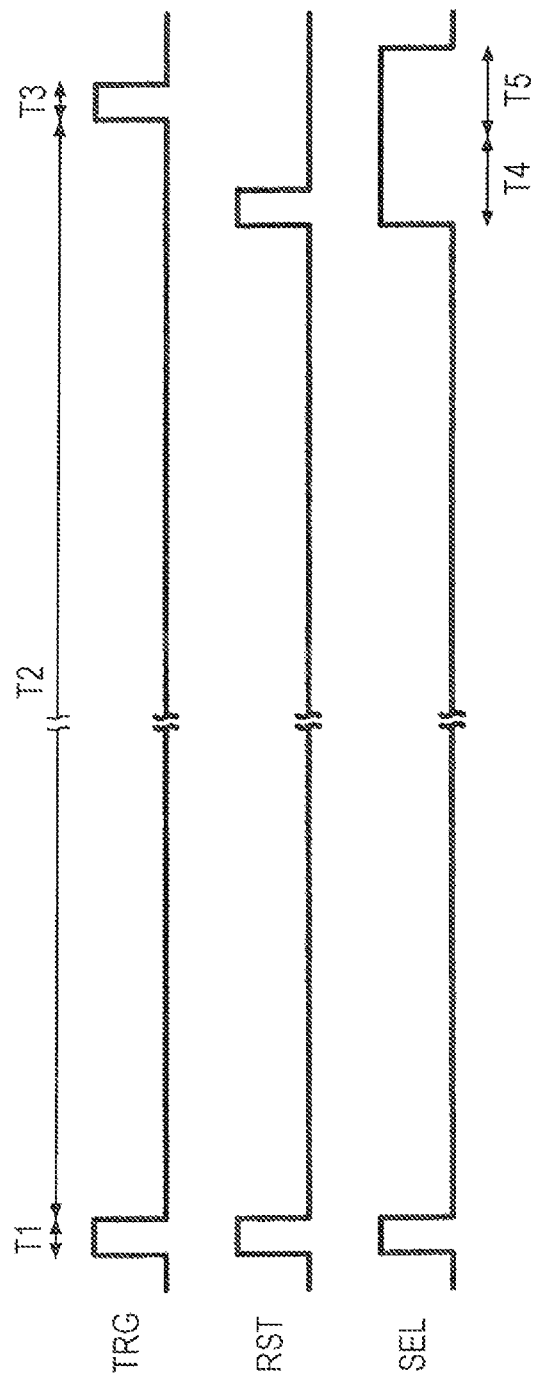
FIG. 4 is a timing diagram for explaining the operation in normal readout.

In the CMOS image sensor 10 formed of the unit pixels 20 arranged in a matrix, the unit pixels 20 each having the pixel circuit configuration shown in FIG. 2, in general, as shown in FIG. 4, the photodiode 21 and the FD section 26 are reset to predetermined electric potentials in period T1, and, in period T2, the received light is photoelectrically converted into electrons and the electrons are accumulated in the photodiode 21. Moreover, in period T4 in the latter part of period T2, the FD section 26 is reset, the electric potential of the FD section 26 at this time is read out as a reset level, the electrons accumulated in the photodiode 21 are then transferred to the FD section 26 in period T3, and the electric potential of the FD section 26 at this time is read out as a signal level in period T5.

Unlike this normal readout operation, in the embodiment of the present disclosure, to improve a signal-to-noise ratio and widen a dynamic range, the following driving is performed. In an accumulation period (a first exposure time) in which the electrons are accumulated by photoelectric conversion, a first control voltage is supplied to the gate electrode of the transfer transistor 22, and a second control voltage with a voltage value which is different from the first control voltage is supplied to the gate electrode of the transfer transistor 22 one or more than one time. Before supply of one or a plurality of voltages of the second control voltages, a third control voltage with the same voltage value as the one second control voltage or each of the plurality of second control voltages is supplied to the gate electrode of the transfer transistor 22 one or more than one time. The signal charges which are transferred to the FD section 26 by the transfer transistor 22 when the first control voltage is supplied are read out, and the signal charges which are transferred to the FD section 26 by the transfer transistor 22 when the second control voltages are sequentially supplied are read out one or more times.

Here, the first control voltage is a voltage that can transfer the accumulated electric charge of the photodiode 21 completely to the FD section 26 by the transfer transistor 22. Hereinafter, the first control voltage is referred to as a complete transfer voltage. Moreover, the second and third control voltages are the intermediate voltages described above. Hereinafter, the second and third control voltages are referred to as intermediate voltages. In this example, since the transfer transistor 22 is an NMOS transistor, the voltage value which is different from the first control voltage means a voltage value which is lower than the first control voltage. It goes without saying that, when the transfer transistor 22 is a PMOS transistor, the voltage value which is different from the first control voltage means a voltage value which is higher than the first control voltage. Furthermore, a case in which the second and third control voltages have the "same voltage value" includes not only a case in which the voltage values of the second and third control voltages are exactly the same, but also a case in which the voltage values of the second and third control voltages contain a certain amount of error on the order of a few percent.

Figure 5:
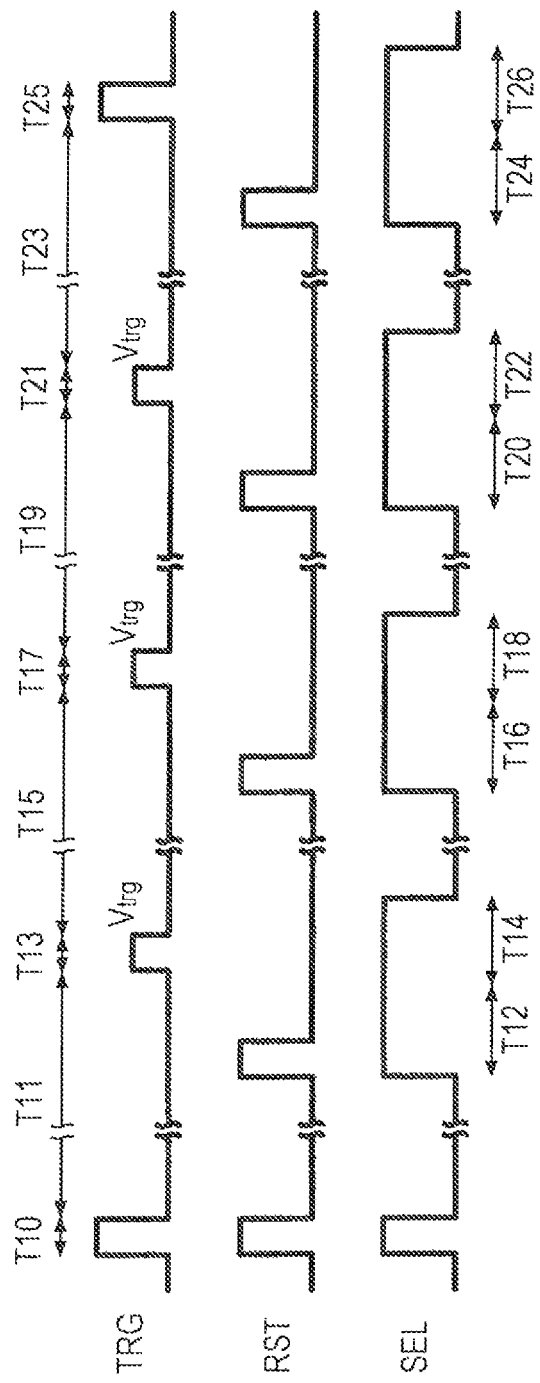
FIG. 5 is a timing diagram for explaining the operation to improve a signal-to-noise ratio and widen a dynamic range.

Specifically, as shown in FIG. 5, in period T10, the photodiode 21 and the FD section 26 are reset, and, in period T11, the received light is photoelectrically converted into electrons and the electrons are accumulated in the photodiode 21. Then, the FD section 26 is reset in period T12. Here, the electric potential of the FD section 26 in period T12 may be read out as a reset level.

Next, in period T13, an intermediate voltage (a third control voltage) $V_{trg}$ is supplied to the gate electrode of the transfer transistor 22, and partial transfer to the FD section 26 is performed in accordance with the number of electrons accumulated in the photodiode 21, this number being determined from the intensity of incident light. In period T14, the electric potential of the FD section 26 based on the number of transferred electrons is read out as a signal level, and noise cancelling processing is performed, if necessary, in the column circuit 18, for example, by using the reset level read out in period T12.

In period T15, accumulation operation is continuously performed, and the FD section 26 is reset again in period T16. Here, the electric potential of the FD section 26 in period T16 may be read out as a reset level. Furthermore, in period T17, the intermediate voltage (the third control voltage) $V_{trg}$ is supplied to the gate electrode of the transfer transistor 22, and, of the sum of the electrons left in the photodiode 21 without being transferred in period T13 and the electrons accumulated in period T15, the electrons exceeding the electric potential of the transfer transistor 22 by the application of the intermediate voltage are transferred to the FD section 26. In period T18, the electric potential may be read out as a signal level.

From period T19 to period T22, the same operation is repeated by applying an intermediate voltage (a second control voltage) $V_{trg}$ with the same voltage value as the previous intermediate voltage to the gate electrode of the transfer transistor 22. Moreover, the operation from period T11 to period T14 is performed one or multiple times while changing the voltage supplied to the transfer transistor 22. Then, after exposure is performed in period T23, the reset operation is performed again in period T24, and the reset level is read out. Next, in period T25, complete transfer to the FD section 26 is performed by changing the state of the transfer transistor 22 to a complete ON state, and the signal level is read out in period T26.

Figure 6:
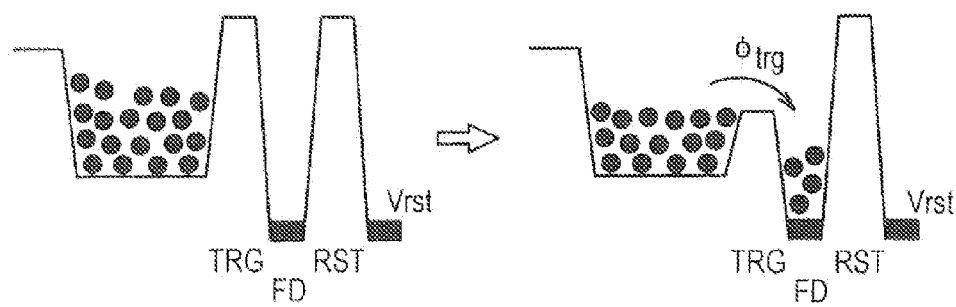
FIG. 6 is an electric potential diagram showing an example of electric potential in a pixel when a plurality of voltages are selectively supplied to a control electrode of a transfer transistor.

Here, an example of electric potential in a pixel when the intermediate voltage $V_{trg}$ is supplied to the gate electrode of the transfer transistor 22 is shown in FIG. 6. When the number of electrons accumulated in the photodiode 21 is large and exceeds electric potential φtrg by the application of the intermediate voltage $V_{trg}$, the electrons accumulated in the photodiode 21 are partially transferred to the FD section 26.

2. Operation of the Embodiment

In this embodiment, to resolve the problem caused by a water gate method and a multiple exposure method, switching between the water gate method and the multiple exposure method is performed. Although the sensitivity in a dark part is lower than that of the water gate method, the multiple exposure method has an advantage that the shutter speed can be changed unrestrictedly. Therefore, by using the multiple exposure method in a bright shooting scene, wide dynamic range shooting can be realized by exposure control using a shutter without using an iris. This makes it possible to prevent the problem of a diffraction phenomenon caused by making the opening of the iris smaller in the bright shooting scene.

Switching between the water gate mode and the multiple exposure mode will be described. Switching between the water gate mode and the multiple exposure mode is performed by an update of the exposure in autoexposure (AE) of the image pickup device. The update of the exposure is performed on a frame by frame basis, for example.

In updating the exposure, a pixel value (for example, a luminance value) based on the signal level is first obtained, and a detection value indicating the brightness of the entire screen is obtained (step S1). Then, based on the detection value, controlling values for gain, an iris, and a shutter are calculated (step S2).

Next, it is determined whether or not the wide dynamic range mode is set to ON in the image pickup device (step S3). If the wide dynamic range mode is set to OFF, shooting is performed by using a normal dynamic range.

On the other hand, if the wide dynamic range mode is set to ON, shooting in the water gate mode or shooting in the multiple exposure mode is performed.

First, it is determined whether the current mode is the multiple exposure mode or the water gate mode (step S4). If the current mode is the multiple exposure mode, it is determined whether or not the calculated gain is greater than the previously set return hysteresis (X dB) (step S5). If the gain is equal to or smaller than the hysteresis, the multiple exposure mode is maintained. On the other hand, if the shooting scene becomes darker and the gain exceeds the hysteresis, the mode is changed to the water gate mode, and the gain is adjusted (step S6). Since the water gate mode has a higher signal-to-noise ratio in the dark part than the multiple exposure mode, the gain is decreased by a certain amount, for example, 6 dB.

On the other hand, if the current mode is the water gate mode, it is determined whether or not the calculated gain is 0 (zero) (step S7). If the gain is not 0, the water gate mode is maintained. On the other hand, if the shooting scene becomes brighter and the gain is 0, the mode is changed to the multiple exposure mode, and the gain is adjusted (step S8). Since the multiple exposure mode has lower sensitivity than the water gate mode, the gain is increased by a certain amount, for example, 6 dB.

With the operation described above, the update of the exposure on a frame-by-frame basis is ended.

Figure 14:
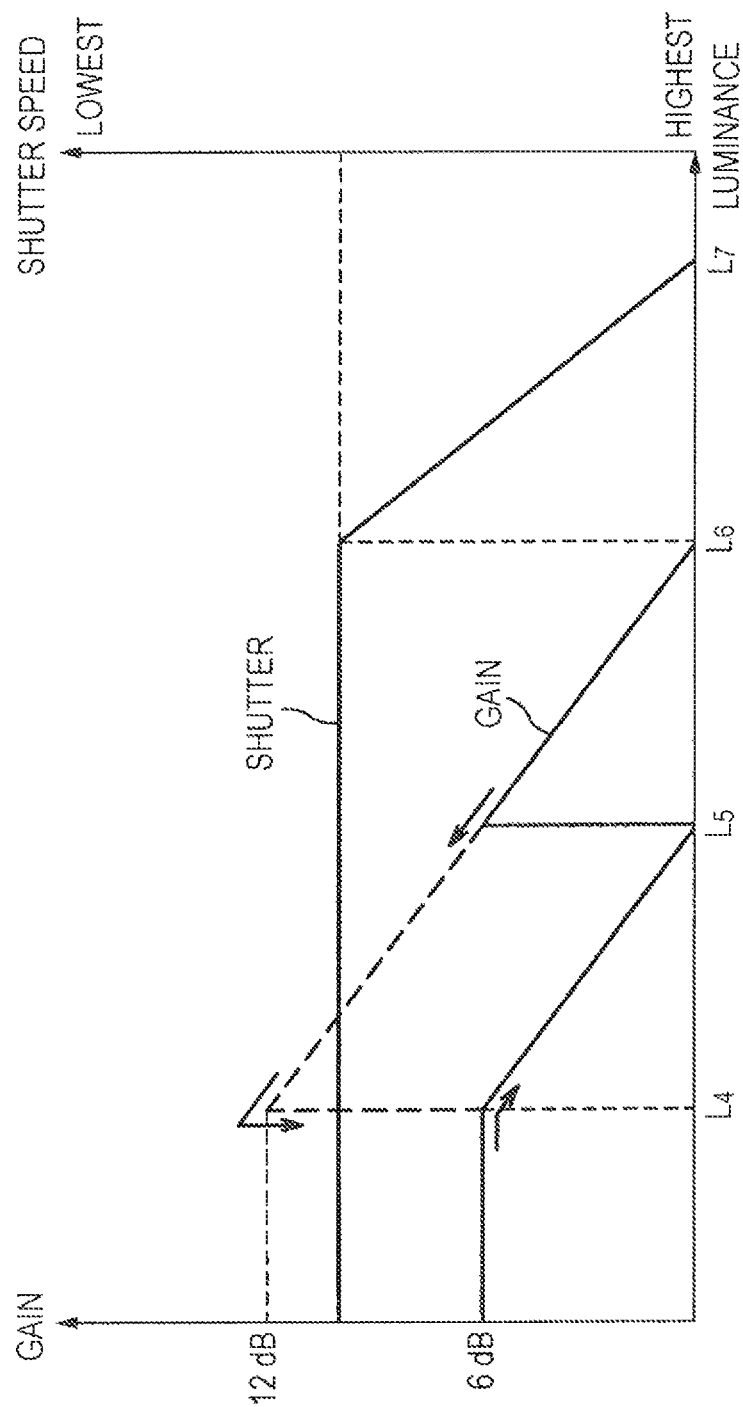
FIG. 14 is a graph showing the relationship between gain and luminance and the relationship between an iris and luminance, the graph showing the transition of the exposure control of the embodiment of the present disclosure.

Next, with reference to FIG. 14, the transition from the water gate mode to the multiple exposure mode and vice versa will be described. FIG. 14 is a graph showing the relationship between gain and luminance and the relationship between a shutter speed and luminance.

In the wide dynamic range mode in this embodiment, the iris is not adjusted and the opening thereof is fully opened.

First, the transition that occurs when the entire screen is getting bright will be described.

In a shooting scene in which the entire screen is dark, the gain is set at 6 dB, for example, and the mode is set to the water gate mode. When the shooting scene gets brighter in the water gate mode, for example, when the luminance exceeds $L_4$ in an example of FIG. 14, the gain starts decreasing. Then, when the luminance becomes $L_5$, the gain becomes 0. At this time, the mode is changed from the water gate mode to the multiple exposure mode. Then, the gain is set at 6 dB again. Thereafter, when the shooting scene gets brighter in the multiple exposure mode, the gain starts decreasing. Then, when the luminance becomes $L_6$, for example, the gain becomes 0. At this time, the adjustment of the shutter speed is started and the shutter speed is increased until the luminance becomes $L_7$, whereby the exposure is adjusted.

Next, the transition that occurs when the entire screen is getting dark will be described.

In a scene in which the entire screen is bright, the mode is set to the multiple exposure mode. Then, when the shooting scene gets darker in the multiple exposure mode, for example, when the luminance becomes $L_6$ or lower, the gain starts increasing. In this embodiment, to provide hysteresis, the mode is not changed to the water gate mode even when the luminance becomes $L_5$, and the gain is increased in the multiple exposure mode. Then, when the luminance decreases to $L_4$ and the gain becomes 12 dB, for example, the gain becomes higher than the previously set hysteresis. At this time, the mode is changed from the multiple exposure mode to the water gate mode. Then, the gain is set at 6 dB again. Thereafter, when the entire screen gets further darker, the water gate mode is maintained with the gain remained constant.

As described above, by providing hysteresis, it is possible to suppress a sudden change or the like in an image due to a change in gain at the time of mode switching.

Figure 15:
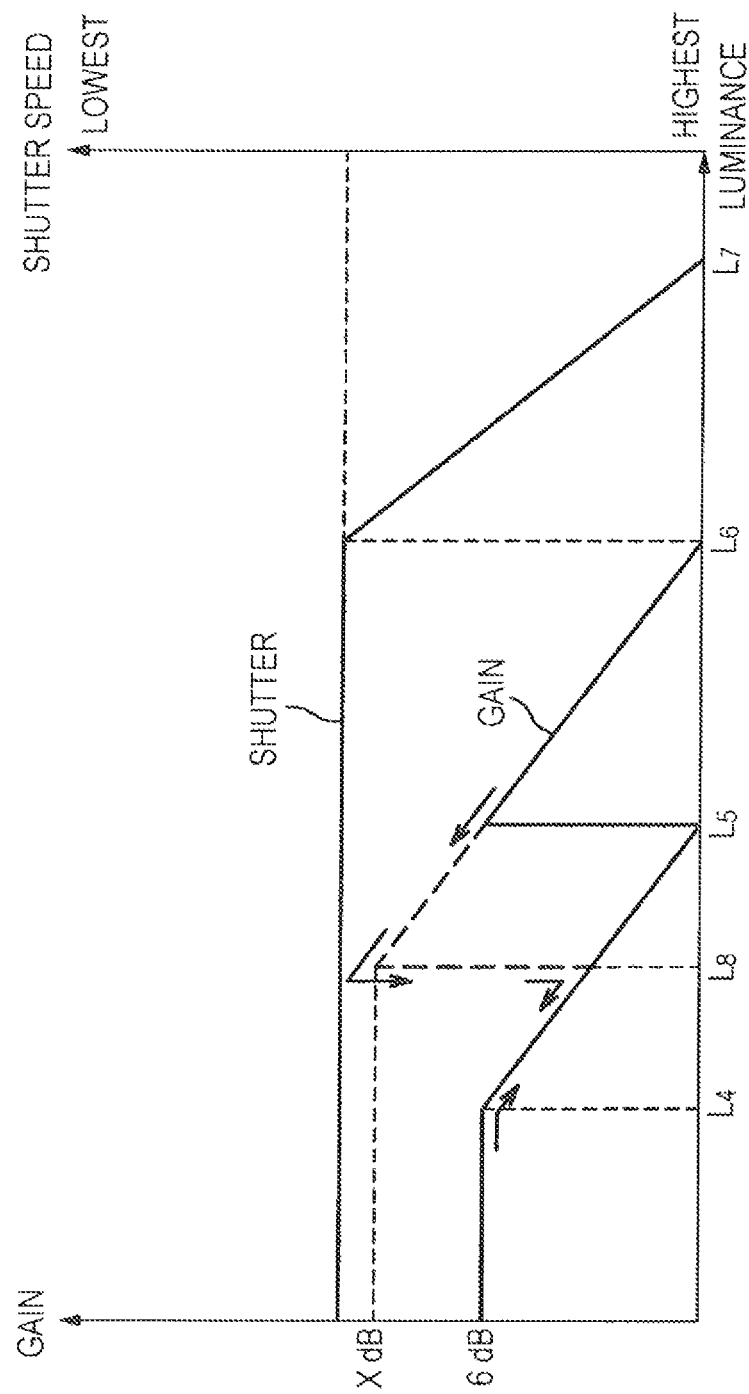
FIG. 15 is a graph showing the relationship between gain and luminance and the relationship between an iris and luminance, the graph showing the transition of the exposure control of the embodiment of the present disclosure and showing a modified example.
Figure 16:
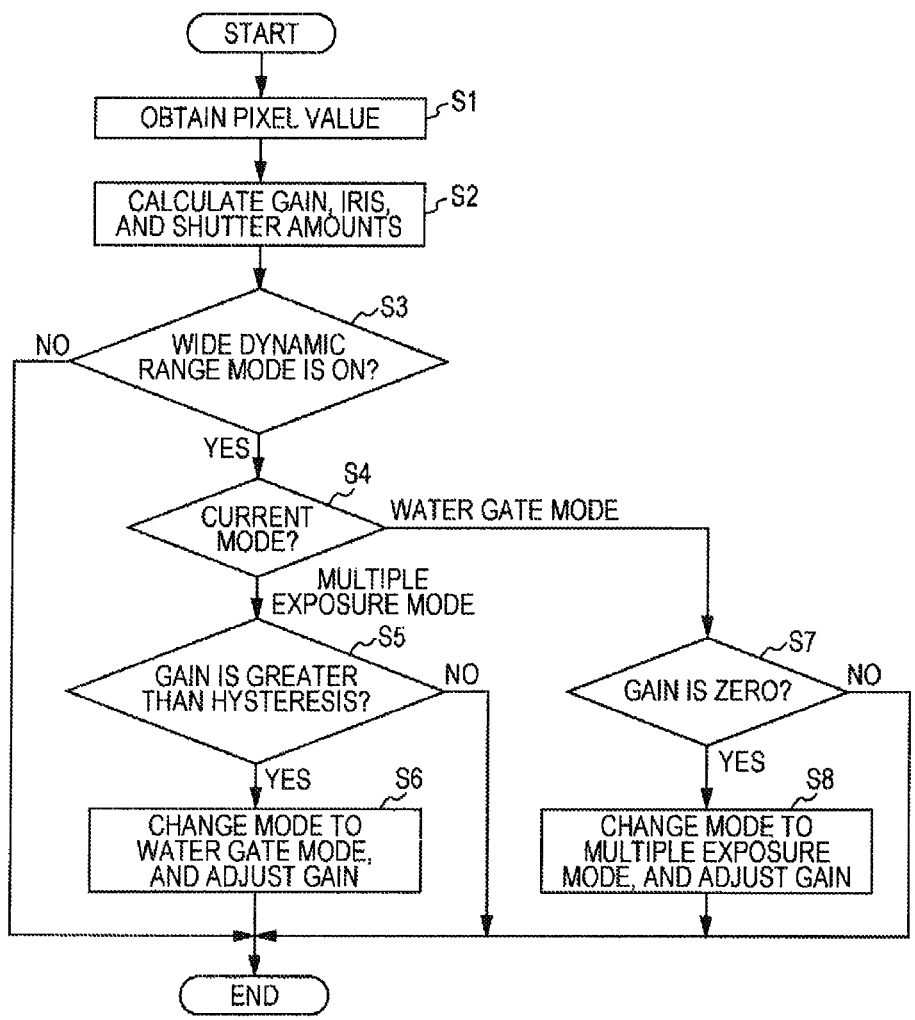
FIG. 16 is a flowchart showing the operation for switching between the water gate mode and the multiple exposure mode of the embodiment of the present disclosure.
Figure 17:
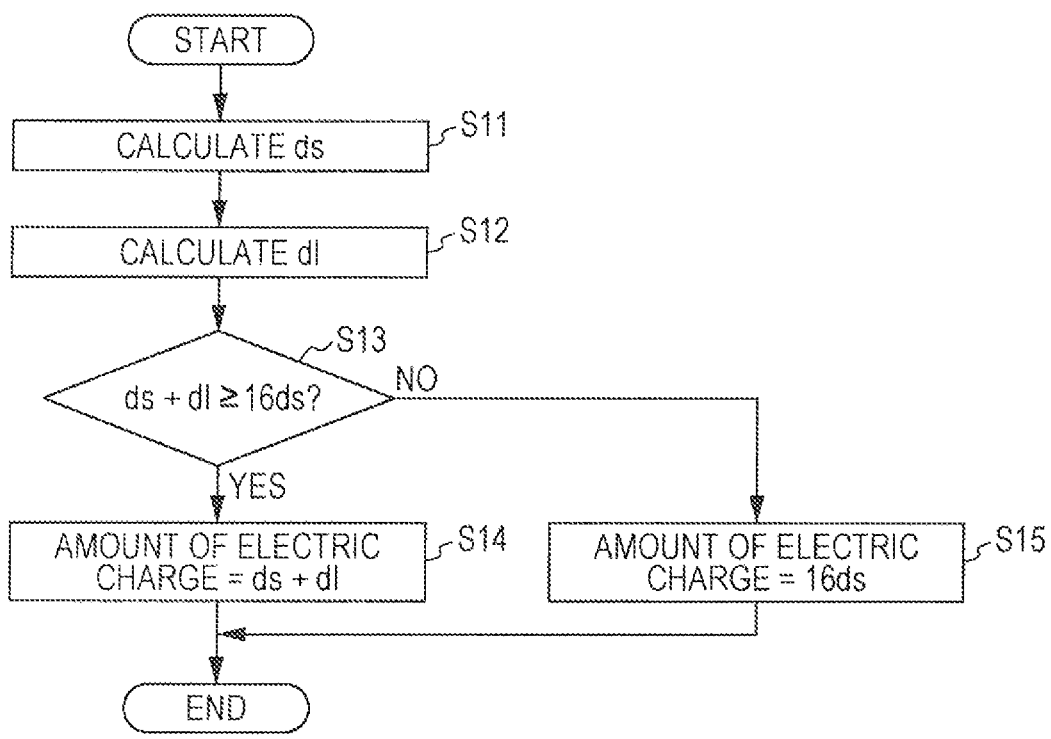
FIG. 17 is a flowchart showing the operation for calculating the amount of accumulated electric charge in the water gate mode.

Incidentally, in the example described above, a case in which the hysteresis is set at 12 dB has been shown; however, as shown in FIG. 15, the hysteresis may be set at another value (X dB). For example, when the luminance decreases to $L_8$ and the gain becomes X dB, the mode is changed from the multiple exposure mode to the water gate mode. Then, the gain is set at a value which is 6 dB lower than X dB. Thereafter, when the shooting scene gets darker in the water gate mode, the gain starts increasing, and, when the luminance becomes $L_4$, the gain is set at 6 dB. When the entire screen gets further darker, the water gate mode is maintained with the gain remained constant.

Figure 13:
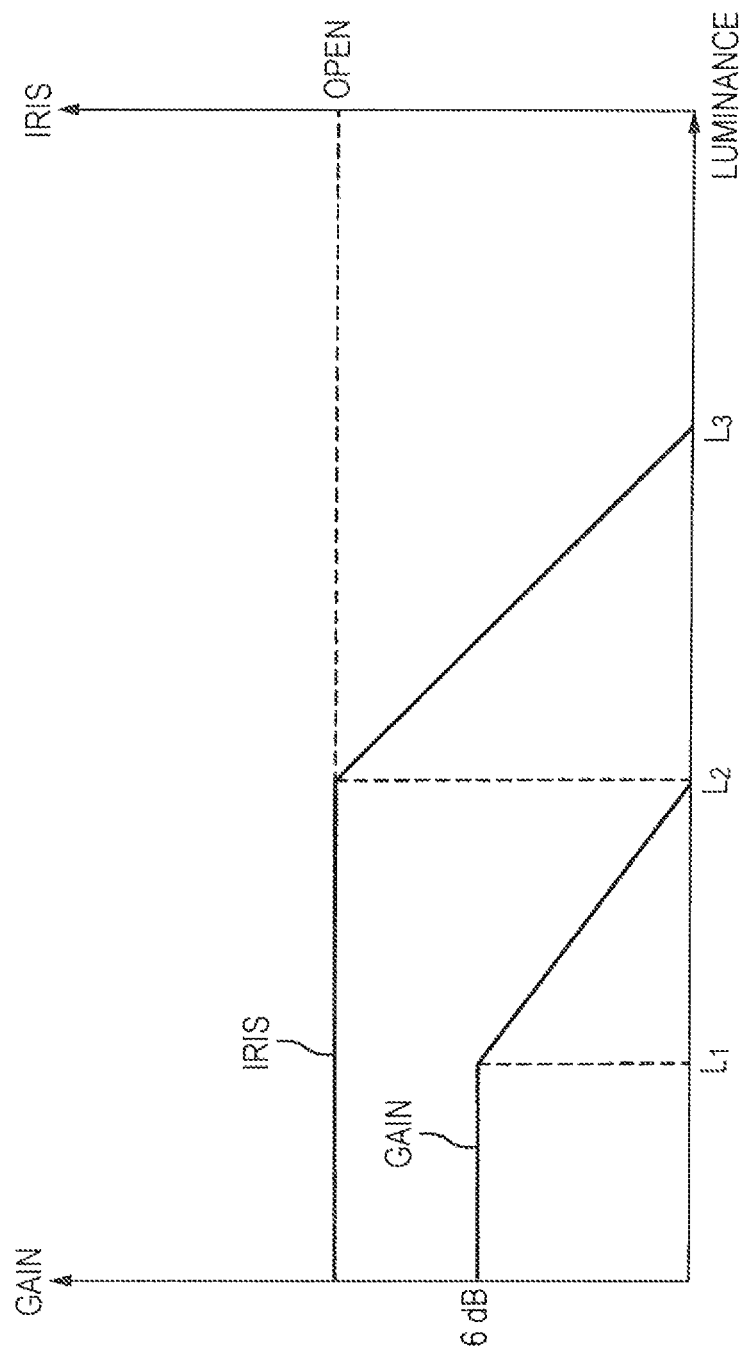
FIG. 13 is a graph showing the relationship between gain and luminance and the relationship between an iris and luminance, the graph showing the transition of the exposure control of the related art.

In the past, to obtain a wide dynamic range in the water gate mode, as shown in FIG. 13, after the luminance exceeded $L_1$, the gain was decreased with the increasing luminance. Then, after the luminance exceeded $L_2$ and the gain reached 0, the iris was adjusted until the luminance became $L_3$. However, since the exposure control using the iris makes the diaphragm smaller in the bright shooting scene, blurring occurs in the entire image due to the diffraction of light (so-called diffraction phenomenon), making it difficult to adjust the focus. On the other hand, in this embodiment, since the multiple exposure mode is used in the bright shooting scene, it is possible to perform exposure control by using the shutter speed without using the iris. This makes it possible to resolve the problem of the diffraction phenomenon.

Next, calculation of the amount of accumulated electric charge in the water gate mode will be described.

In the water gate mode, as shown in FIGS. 9 to 12, for example, the time between $t_4$ and $t_5$ is set at 1/16 of the exposure time $t_0$ to $t_6$ of one frame. Then, the electric charge more than or equal to the accumulated electric charge $d_M$ is reset at time $t_4$, exposure is performed again between $t_4$ and $t_5$, and the electric charge more than or equal to the accumulated electric charge $d_M$ is reset at time $t_5$. Then, exposure is performed between $t_5$ and $t_6$ so that an electric charge is further accumulated and added to the accumulated electric charge $d_M$, and the electric charge more than or equal to the accumulated electric charge 0 is reset at time $t_6$.

Then, based on the amount of electric charge exposed between $t_4$ and $t_5$ $ds=d_3-d_M$ ($ds$>0) and the amount of electric charge exposed in the exposure time ($t_0$ to $t_6$) of one frame, the amount of electric charge which is obtained by exposure in one frame is calculated.

Specifically, first, the amount of electric charge exposed between $t_4$ and $t_5$ $ds=d_3-d_M$ ($ds$>0) is calculated (step S11). Moreover, the amount of electric charge $dl=d_4$ exposed in the exposure time ($t_0$ to $t_6$) of one frame is calculated (step S12).

Figure 9:
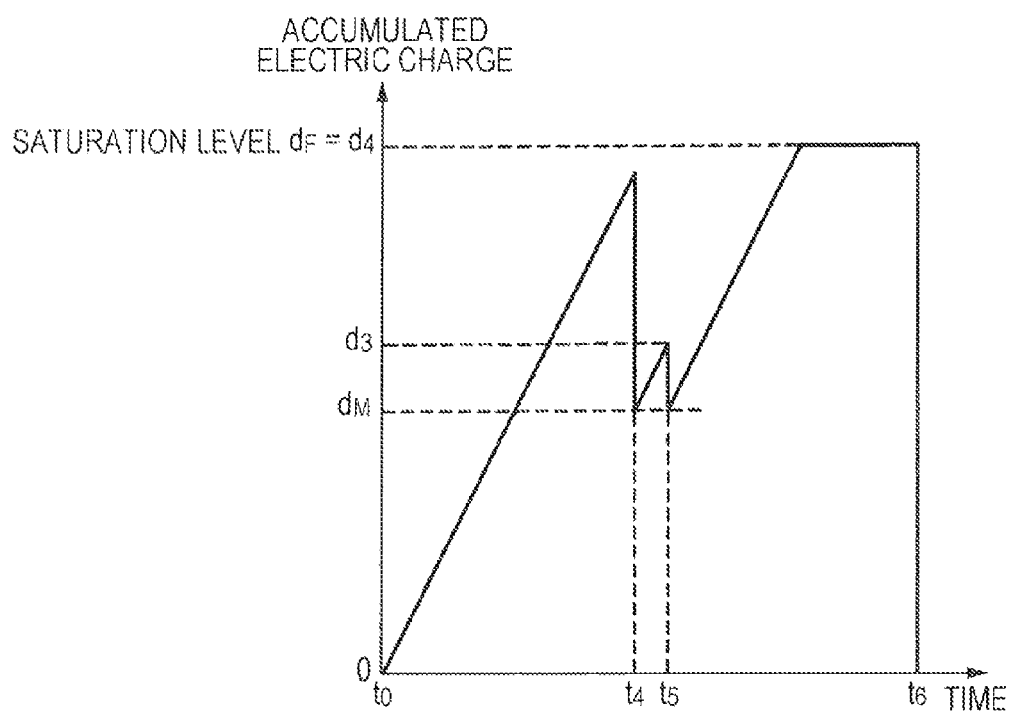
FIG. 9 is a graph showing the relationship between accumulated electric charge and time in the water gate mode.
Figure 10:
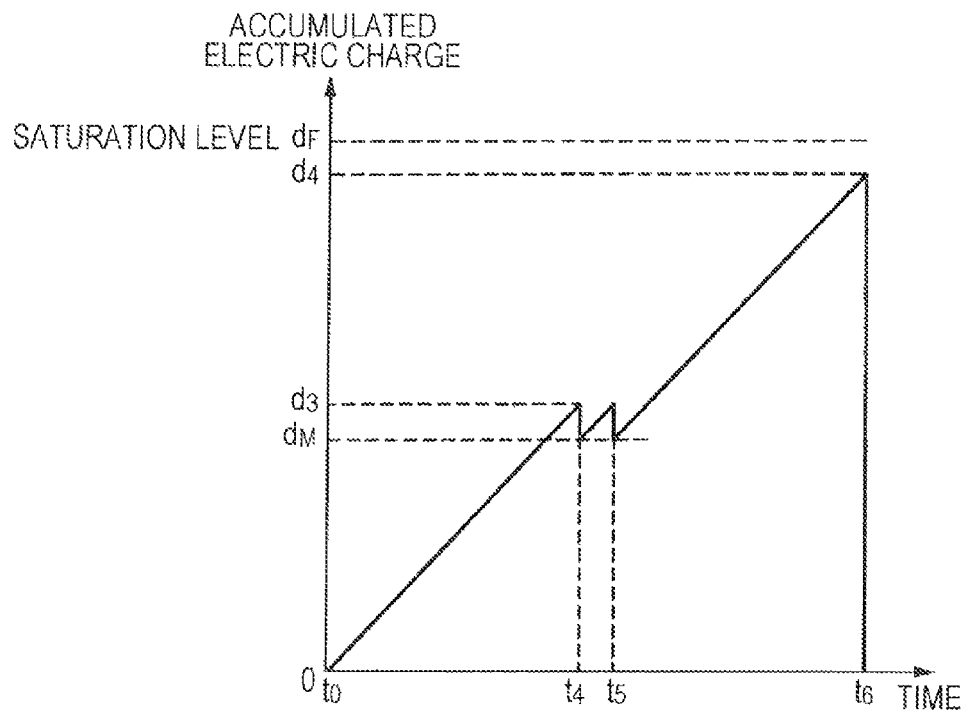
FIG. 10 is a graph showing the relationship between accumulated electric charge and time in the water gate mode, the graph showing a case in which the luminance is lower than the luminance of FIG. 9.
Figure 11:
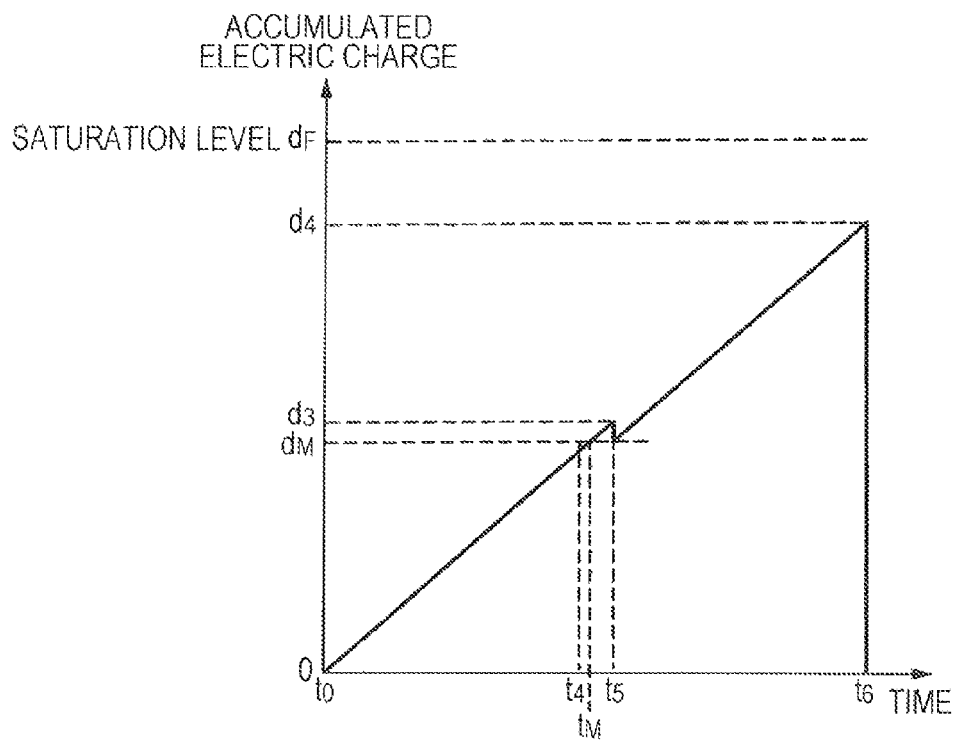
FIG. 11 is a graph showing the relationship between accumulated electric charge and time in the water gate mode, the graph showing a case in which the luminance is lower than the luminance of FIG. 10.
Figure 12:
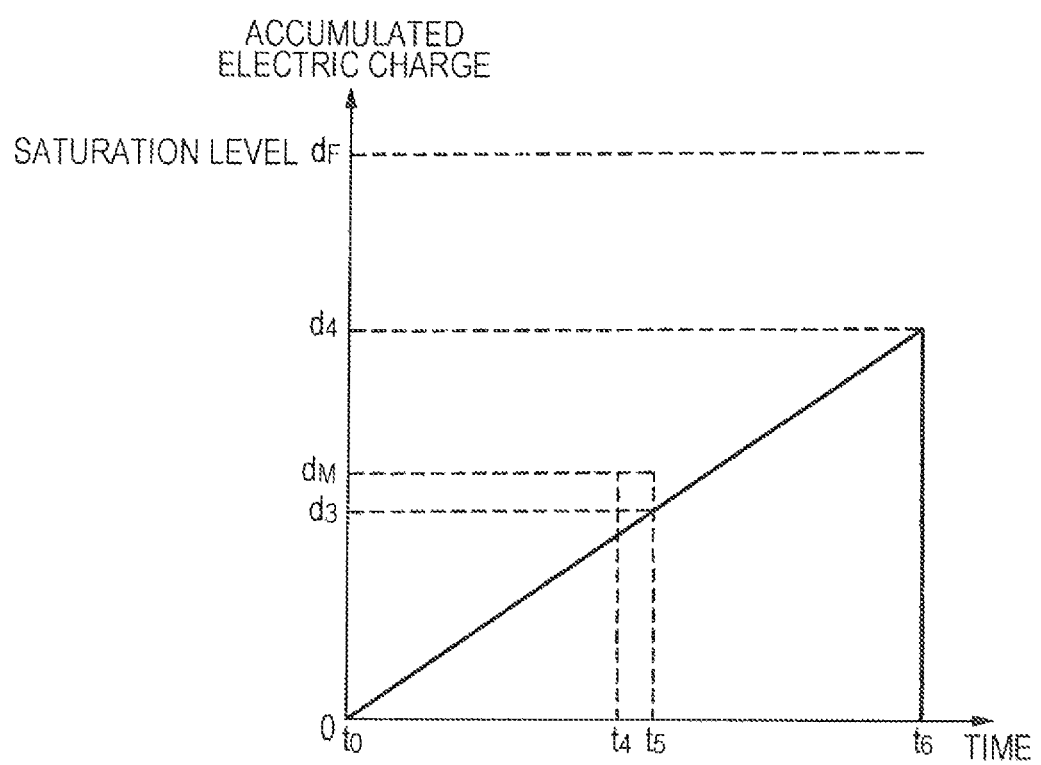
FIG. 12 is a graph showing the relationship between accumulated electric charge and time in the water gate mode, the graph showing a case in which the luminance is lower than the luminance of FIG. 11.

As shown in FIGS. 9 and 10, when the electric charge more than or equal to the accumulated electric charge $d_M$ is accumulated at time $t_4$, the original amount of electric charge which is obtained in the exposure time of one frame is calculated by multiplying the amount of electric charge ds exposed between $t_4$ and $t_5$ by a constant. On the other hand, as shown in FIGS. 11 and 12, when the electric charge which is less than the accumulated electric charge $d_M$ is accumulated at time $t_4$, the electric charge is not reset at time $t_4$. Therefore, based on the amount of electric charge ds exposed between $t_4$ and $t_5$ and the amount of electric charge dl exposed in the exposure time ($t_0$ to $t_6$) of one frame, the original amount of electric charge which is obtained in the exposure time of one frame is calculated.

For example, when the time between $t_4$ and $t_5$ is set at 1/16 of the exposure time $t_0$ to $t_6$ of one frame, it is determined whether or not ds+dl is more than or equal to 16 ds (step S13). If ds+dl is more than or equal to 16 ds, which is a case as shown in FIGS. 11 and 12, for example, ds+dl is determined to be the original amount of electric charge which is obtained in the exposure time of one frame (step S14). On the other hand, if ds+dl is less than 16 ds, which is a case as shown in FIGS. 9 and 10, for example, 16 ds is determined to be the original amount of electric charge which is obtained in the exposure time of one frame (step S15).

Next, calculation of the amount of accumulated electric charge in the multiple exposure mode will be described.

Figure 7:
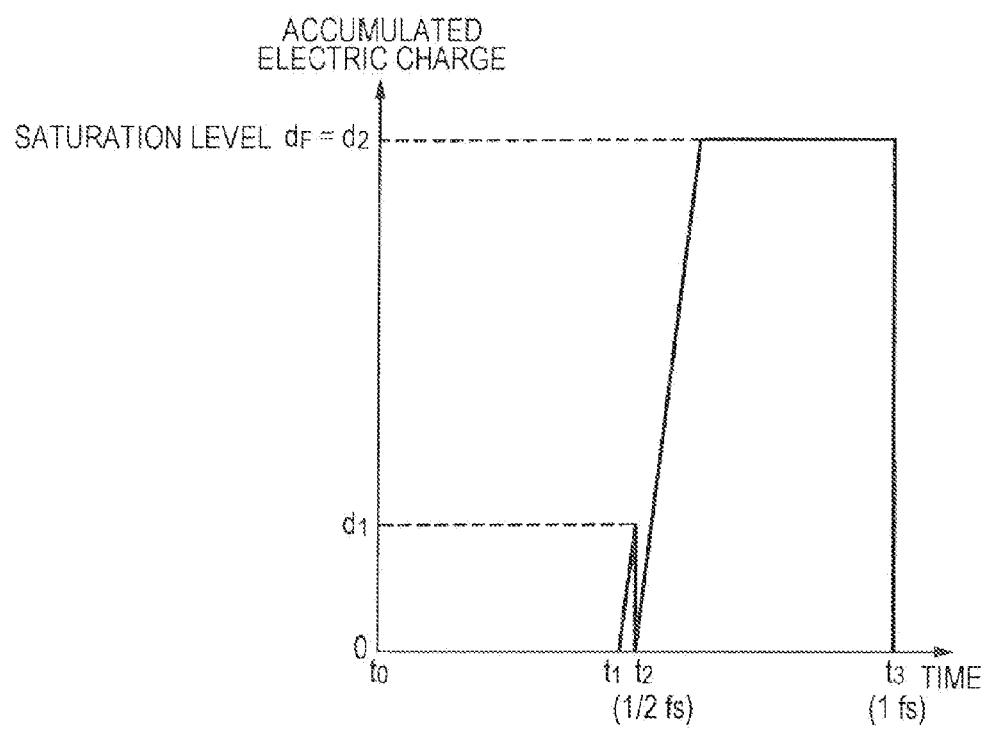
FIG. 7 is a graph showing the relationship between accumulated electric charge and time in the multiple exposure mode.
Figure 8:
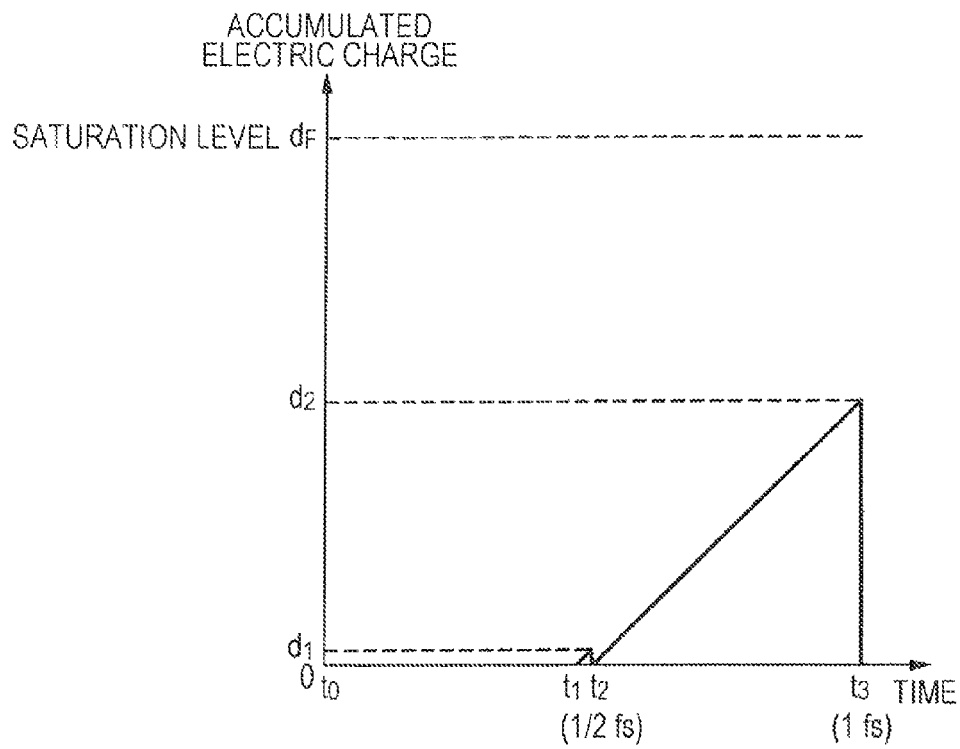
FIG. 8 is a graph showing the relationship between accumulated electric charge and time in the multiple exposure mode, the graph showing a case in which the luminance is lower than the luminance of FIG. 7.

In the multiple exposure mode, as shown in FIGS. 7 and 8, for example, the exposure time $t_1$ to $t_2$ in the first half period is set at 1/16 of the exposure time $t_2$ to $t_3$ in the second half period. Then, at time $t_2$ and time $t_3$, the electric charge more than or equal to the accumulated electric charge 0 is reset. Thereafter, the original amount of electric charge which is obtained in the exposure time of one frame is calculated by using the amount of electric charge $d_1$ exposed between $t_1$ and $t_2$ and the amount of electric charge $d_2$ (when the accumulated electric charge does not reach the saturation level) exposed between $t_2$ and $t_3$. In the example shown in FIGS. 7 and 8, a case in which the exposure time $t_2$ to $t_3$ in the second half period is set at ½ fs is shown; however, in the multiple exposure mode, the exposure time is not limited to this example, and the exposure time can be set unrestrictedly. For example, the exposure time $t_1$ to $t_2$ in the first half period and the exposure time $t_2$ to $t_3$ in the second half period can be further shortened. Moreover, the number of exposure operations is not limited to two; the exposure operation may be performed three or more times. This makes it possible to calculate the original amount of electric charge even in the bright shooting scene without using the iris (diaphragm) unlike in the water gate mode.

In the dark shooting scene, in the multiple exposure mode, the exposure time can be set only at a maximum duration of ½ fs; however, in the water gate mode, the exposure time can be set at a maximum duration of 1 fs. As a result, in this embodiment, since the water gate mode is used when the entire screen is dark, as compared to a case in which the multiple exposure mode is used, it is possible to improve the sensitivity in the dark part.

Image Pickup Device

The CMOS image sensor 10 according to this embodiment is suitably used in an image pickup device such as a digital still camera or a video camera as an imaging device (an image input device) thereof.

The image pickup device here refers to a solid state image pickup device as an imaging device, a camera module (which is used by being incorporated into electronic equipment such as a cellular telephone) including an optical system that forms an image of image light of a subject on an imaging area (a light-receiving surface) of the solid state image pickup device and a signal processing section of the solid state image pickup device, and a camera system such as a digital still camera and a video camera into which the camera module is incorporated.

Figure 18:
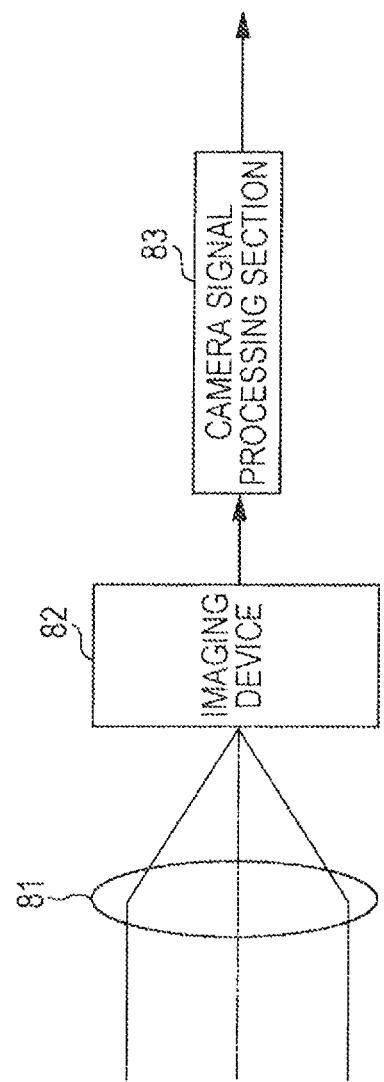
FIG. 18 is a block diagram showing an example of the configuration of an image pickup device according to an embodiment of the present disclosure.

FIG. 18 is a block diagram showing an example of the configuration of the image pickup device according to the embodiment of the present disclosure. As shown in FIG. 18, the image pickup device according to the embodiment of the present disclosure is formed of an optical system including a lens 81, an imaging device (an imaging section) 82, a camera signal processing section 83, and the like.

The lens 81 forms an image of image light from a subject on an imaging area of the imaging device 82. The imaging device 82 outputs an image signal obtained by converting the image light of the image formed on the imaging area by the lens 81 into an electrical signal by pixel. As the imaging device 82, the CMOS image sensor 10 according to this embodiment is used. The camera signal processing section 83 performs various kinds of signal processing on the image signal output from the imaging device 82.

The camera signal processing section 83 is an example of the signal processing section, and determines the signal level in the water gate mode or the multiple exposure mode by switching the mode between the water gate mode and the multiple exposure mode. Moreover, the camera signal processing section 83 determines the gain adjusting the signal level in accordance with a detection value based on the electric charge, and performs switching between the water gate mode and the multiple exposure mode based on the gain.

Although a preferred embodiment of the present disclosure has been described in detail with reference to the accompanying drawings, these examples are not meant to limit the present disclosure in any way. Obviously, persons who have common knowledge in the technical field to which the present disclosure pertains can conceive of various modifications or alterations within the scope of the technical idea according to an embodiment of the present disclosure, and it should be understood that these modifications or alterations should be construed as being included in the technical scope of the present disclosure.

The present disclosure contains subject matter related to that disclosed in Japanese Priority Patent Application JP 2010-216285 filed in the Japan Patent Office on Sep. 28, 2010, the entire contents of which are hereby incorporated by reference.

What is claimed is:

1. An image processing apparatus comprising:
a pixel array section in which unit pixels, each having a photoelectric conversion element converting light into an electric charge, are two-dimensionally arranged in a matrix; and
a signal processing section that determines a signal level by using a water gate mode or a multiple exposure mode, the water gate mode being a mode in which the signal level is determined in accordance with a first amount of electric charge based on an electric charge accumulated in the unit pixels, the electric charge being more than or equal to a prescribed accumulated electric charge, in a first exposure period or a second amount of electric charge based on all the electric charges accumulated in the unit pixels in a second exposure period including the first exposure period, the multiple exposure mode being a mode in which the signal level is determined in accordance with a plurality of amounts of electric charge based on all the electric charges accumulated in the unit pixels in a plurality of exposure periods, the signal processing section determining gain adjusting the signal level in accordance with a detection value based on the electric charge, and switching the mode to the water gate mode or the multiple exposure mode based on the gain, such that when the mode is the water gate mode, the signal processing section switches the mode to the multiple exposure mode when the gain becomes 0.

2. An image processing apparatus comprising:
a pixel array section in which unit pixels, each having a photoelectric conversion element converting light into an electric charge, are two dimensionally arranged in a matrix: and
a signal processing section that determines a signal level by using a water gate mode or a multiple exposure mode, the water gate mode being a mode in which the signal level is determined in accordance with a first amount of electric charge based on an electric charge accumulated in the unit pixels, the electric charge being more than or equal to a prescribed accumulated electric charge, in a first exposure period or a second amount of electric charge based on all the electric charges accumulated in the unit pixels in a second exposure period including the first exposure period, the multiple exposure mode being a mode in which the signal level is determined in accordance with a plurality of amounts of electric charge based on all the electric charges accumulated in the unit pixels in a plurality of exposure periods, the signal processing section determining gain adjusting the signal level in accordance with a detection value based on the electric charge, and switches a mode to the water gate mode or the multiple exposure mode based on the gain, such that when the mode is the multiple exposure mode, the signal processing section switches the mode to the water gate mode when the gain becomes more than or equal to a previously set hysteresis.

3. A method for processing an image, comprising:
converting light into an electric charge by using a pixel array section in which unit pixels, each having a photoelectric conversion element, are two-dimensionally arranged in a matrix; and
determining a signal level by a signal processing section by using a water gate mode or a multiple exposure mode, the water gate mode being a mode in which the signal level is determined in accordance with a first amount of electric charge based on an electric charge accumulated in the unit pixels, the electric charge being more than or equal to a prescribed accumulated electric charge, in a first exposure period or a second amount of electric charge based on all the electric charges accumulated in the unit pixels in a second exposure period including the first exposure period, the multiple exposure mode being a mode in which the signal level is determined in accordance with a plurality of amounts of electric charge based on all the electric charges accumulated in the unit pixels in a plurality of exposure periods, the signal processing section determining gain adjusting the signal level in accordance with a detection value based on the electric charge, and switching the mode to the water gate mode or the multiple exposure mode based on the gain, such that when the mode is the water gate mode, the signal processing section switches the mode to the multiple exposure mode when the gain becomes 0, and when the mode is the multiple exposure mode, the signal processing section switches the mode to the water gate mode when the gain becomes more than or equal to a previously set hysteresis.

4. A non-transitory storage medium storing a program that, when executed by a processor executes a process comprising:
converting light into an electric charge by using a pixel array section in which unit pixels, each having a photoelectric conversion element, are two-dimensionally arranged in a matrix; and
determining a signal level by a signal processing section by using a water gate mode or a multiple exposure mode, the water gate mode being a mode in which the signal level is determined in accordance with a first amount of electric charge based on an electric charge accumulated in the unit pixels, the electric charge being more than or equal to a prescribed accumulated electric charge, in a first exposure period or a second amount of electric charge based on all the electric charges accumulated in the unit pixels in a second exposure period including the first exposure period, the multiple exposure mode being a mode in which the signal level is determined in accordance with a plurality of amounts of electric charge based on all the electric charges accumulated in the unit pixels in a plurality of exposure periods, the signal processing section determining gain adjusting the signal level in accordance with a detection value based on the electric charge, and switching the mode to the water gate mode or the multiple exposure mode based on the gain, such that when the mode is the water gate mode, the signal processing section switches the mode to the multiple exposure mode when the gain becomes 0, and when the mode is the multiple exposure mode, the signal processing section switches the mode to the water gate mode when the gain becomes more than or equal to a previously set hysteresis.

* * * * *